(12) United States Patent
Karhu et al.

(10) Patent No.: US 11,427,734 B2
(45) Date of Patent: Aug. 30, 2022

(54) LINERLESS THERMAL LABEL WEB AND LABELS PRODUCED THEREOF

(71) Applicant: UPM RAFLATAC OY, Tampere (FI)

(72) Inventors: Johanna Karhu, Nokia (FI); Ismo Pietari, Wroclaw (PL)

(73) Assignee: UPM RAFLATAC OY, Tampere (FI)

(*) Notice: Subject to any disclaimer, the term of this patent is extended or adjusted under 35 U.S.C. 154(b) by 494 days.

(21) Appl. No.: 16/349,753

(22) PCT Filed: Nov. 17, 2016

(86) PCT No.: PCT/FI2016/050812
§ 371 (c)(1),
(2) Date: May 14, 2019

(87) PCT Pub. No.: WO2018/091768
PCT Pub. Date: May 24, 2018

(65) Prior Publication Data
US 2019/0276708 A1    Sep. 12, 2019

(51) Int. Cl.
*C09J 7/29* (2018.01)
*C09J 7/35* (2018.01)
(Continued)

(52) U.S. Cl.
CPC . *C09J 7/29* (2018.01); *C09J 7/21* (2018.01); *C09J 7/35* (2018.01); *C09J 7/401* (2018.01);
(Continued)

(58) Field of Classification Search
CPC ....... C09J 7/29; C09J 7/35; C09J 7/401; C09J 11/04; C09J 11/06; C09J 11/08;
(Continued)

(56) References Cited

U.S. PATENT DOCUMENTS 6,022,050 A    2/2000 Kline
6,579,941 B1 *  6/2003 Sasaki ................... C09J 171/02
                                                    525/100
(Continued)

FOREIGN PATENT DOCUMENTS

JP          4409809 B2    2/2010
JP         2013195889     9/2013
(Continued)

OTHER PUBLICATIONS

International Search Report for International Application No. PCT/FI2016/050812 filed Nov. 17, 2016; dated Jul. 6, 2017; 3 pages.
(Continued)

*Primary Examiner* — Scott R. Walshon
(74) *Attorney, Agent, or Firm* — Cantor Colburn LLP

(57) ABSTRACT

A linerless thermal label web includes layers in the following order: a release layer, a thermal paper comprising a heat sensitive part, and an adhesive layer, wherein the adhesive layer includes an adhesive deadening varnish at longitudinal edge areas of the linerless thermal web so as to reduce the tackiness of the adhesive layer in the longitudinal edge areas. A thermal label can be produced from the label web and the label web can be used for variable information printing applications.

21 Claims, 2 Drawing Sheets

(51) Int. Cl.
- *C09J 7/40* (2018.01)
- *C09J 11/04* (2006.01)
- *G09F 3/10* (2006.01)
- *C09J 11/06* (2006.01)
- *C09J 11/08* (2006.01)
- *G09F 3/02* (2006.01)
- *C09J 7/21* (2018.01)
- *G09F 3/00* (2006.01)

(52) U.S. Cl.
CPC ............... *C09J 11/04* (2013.01); *C09J 11/06* (2013.01); *C09J 11/08* (2013.01); *G09F 3/00* (2013.01); *G09F 3/02* (2013.01); *G09F 3/10* (2013.01); *C09J 2203/334* (2013.01); *C09J 2301/408* (2020.08); *C09J 2400/283* (2013.01); *C09J 2425/00* (2013.01); *C09J 2475/00* (2013.01); *C09J 2483/005* (2013.01); *G09F 2003/0201* (2013.01); *G09F 2003/0229* (2013.01)

(58) Field of Classification Search
CPC ............ C09J 2203/334; C09J 2400/283; C09J 2425/00; C09J 2475/00; C09J 2483/005; G09F 3/02; G09F 3/10; G09F 2003/0201
See application file for complete search history.

(56) References Cited

U.S. PATENT DOCUMENTS

| | | | |
|---|---|---|---|
| 2006/0229411 A1* | 10/2006 | Hatfield | C09J 153/02 525/88 |
| 2008/0193696 A1 | 8/2008 | Hayes | |
| 2012/0258271 A1 | 10/2012 | Maughan | |
| 2014/0017467 A1* | 1/2014 | Inao | B32B 7/12 428/354 |
| 2014/0234558 A1 | 8/2014 | Ikeda et al. | |
| 2015/0294602 A1* | 10/2015 | Read | G09F 3/0291 428/216 |
| 2016/0229211 A1 | 8/2016 | Becker et al. | |

FOREIGN PATENT DOCUMENTS

| | | | | |
|---|---|---|---|---|
| WO | WO-2015130422 A1 * | 9/2015 | ............ | B65D 65/14 |
| WO | WO-2015195616 A1 * | 12/2015 | ............ | C09J 121/00 |

OTHER PUBLICATIONS

Written Opinion of the International Searching Authority for International Application No. PCT/FI2016/050812 filed Nov. 17, 2016; dated Jul. 6, 2017; 7 pages.

Li Hongqiang. The Principle, Technology and Applications of Adhesion. Edition 1st. p. 210-211. South China University of Technology, Press. Jan. 31, 2014, English Translation.

* cited by examiner

LINERLESS THERMAL LABEL WEB AND LABELS PRODUCED THEREOF

CROSS-REFERENCE TO RELATED APPLICATIONS

This application is a National Stage application of PCT/FI2016/050812, filed Nov. 17, 2016, which is incorporated by reference herein in its entirety.

TECHNICAL FIELD

The application relates to a linerless label web and printed labels produced thereof. Especially to a thermally printable web and labels for variable information printing applications.

BACKGROUND

Thermal label webs are generally used for variable information printing applications, for example, in logistic center and retail labelling applications. Applications include address labels, self-service weight-scale labels and labels used for in-store pricing of foodstuff so as to provide identification and variable information, such as logistic information, weight, price or EAN bar code, of the products at the point of sale and during shipping and receiving operations.

SUMMARY

It is an aim of the embodiments to provide a linerless thermal label web suitable for winding to a roll, unwinding and thermal printing. Further is an aim to provide use of the thermal label web for variable information printing applications and a thermal label.

One embodiment provides a linerless thermal label web comprising layers in the following order: a release layer, a thermal paper comprising a heat sensitive part, and an adhesive layer. The adhesive layer includes adhesive deadening varnish at longitudinal edge areas of the linerless thermal web so as to reduce the tackiness of the adhesive layer in the longitudinal edge areas.

One embodiment provides use of a linerless thermal label web for variable information printing applications. Prior to labelling the label web is thermally printed and cut into individual labels.

One embodiment provides a thermal label cut from the linerless thermal label.

Further embodiments of the application are presented in the dependent claims.

In an example, an amount of the release layer is between 0.1 and 1.5 g/m². In an example, the release layer comprises at least 80 wt. % of cross-linked silicone based on cross linkable silicone comprising acrylate groups.

In an example, the release layer further comprises silica and wherein an amount on silica is between 0.5 and 20 wt. %.

In an example, coefficient of friction of the release layer is between 0.3 and 0.6, when measured against glass surface and according to standard ASTM D1894.

In an example, the thermal paper comprises the following layers in the following order: a top coating layer, a thermal layer providing the heat sensitive part, a preliminary coating layer, and a base paper.

In an example, the top coating layer includes polyvinyl alcohol.

In an example, the preliminary coating layer includes binders and pigments.

In an example, the base paper comprises basis weight of 20-200 g/m².

In an example, the thermal paper further comprises a back coating layer on the base paper surface opposite to the preliminary coating layer.

In an example, an amount of the adhesive layer is between 9 and 18 g/m².

In an example, the adhesive layer comprises between 30 and 45 wt. % of styrene based polymer(s), between 40 and 60 wt. % of tackifier(s), and less than 17 wt % of oil(s), such as silicon oil.

In an example, the adhesive layer has dynamic shear at room temperature at least 60 N/25 mm, when measured according to test method of FTM18.

In an example, the adhesive layer uniformly covers a surface area of the thermal paper extending from a first longitudinal edge of the thermal paper to a second longitudinal edge of the thermal paper.

In an example, the longitudinal edge areas including the deadening varnish extend between 3 and 7 mm from the first and the second longitudinal edge towards a centre of the web and form deadened adhesive areas of the adhesive layer.

In an example, each of the deadened adhesive areas covers 3-12% of a width of the label web. The width of the label web is 50, 58, 76, 80 or 100 mm.

In an example, the deadening varnish comprises polyurethane-acrylate varnish or polyacrylate varnish.

In an example, the thermal label comprises thermally printed graphics at the longitudinal edge areas of the linerless thermal label web.

BRIEF DESCRIPTION OF THE DRAWINGS

In the following some examples and embodiments of the invention will be described in more detail with reference to appended drawings, in which.

DETAILED DESCRIPTION

Figure 1:
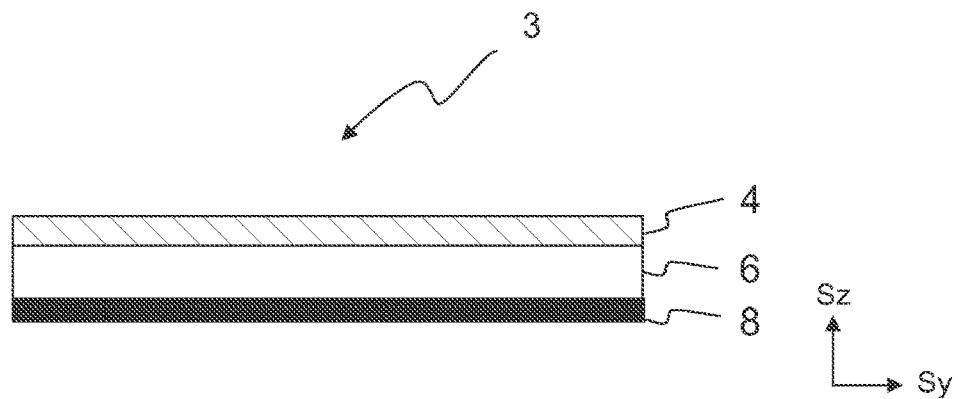
FIG. 1 shows a linerless thermal label.

In this description and claims, the percentage values relating to an amount of raw materials are percentages by weight (wt. %) unless otherwise indicated. Word "comprising" may be used as an open term, but it also comprises the closed term "consisting of". Unit of thickness expressed as microns corresponds to μm. Unit of temperature expressed as degrees C. corresponds to ° C. The following reference numbers and denotations are used in this application:

MRK1 graphics,
Sx, Sy, Sz 3D coordinates,
RT room temperature (23±2° C.),
a width of a label web,
b width of a deadened adhesive area,
1 a continuous linerless thermal label web,
2 a roll of continuous linerless thermal label web,
201 an outer surface of the roll
202 an inner surface of the roll
3 a thermal label, 4 a release layer,
6 a thermal paper,
8 an adhesive layer,
10 adhesive deadening varnish,
601 a base paper,
602 a preliminary coating layer,
603 a thermal coating layer,
604 a top coating layer,
605 a back coating layer,
607 a first longitudinal edge,
609 a second longitudinal edge,
810, 820 a deadened adhesive area (longitudinal edge area).

Term "thermal label web" refers to a continuous label web comprising a heat sensitive part, which is thermally activatable, e.g. during thermal printing, and from which individual labels to be labelled can be cut. Thermal label web is suitable for thermal printing and cutting so as to form individual printed labels.

Term "linerless label web" refers to a label web without a release liner. Eliminating the liner reduces the solid waste stream and saves material costs. Further, an amount of labels per roll is increased thus decreasing the freight and storage costs. In addition potential workplace injuries may be decrease when the hazard of slippery release liner waste on the floor does not exist.

Term "self-wound label web" refers to a linerless label web wound to a roll and, which is suitable for subsequent unwinding of the roll.

Term "thermal label" refers to a label cut from the thermal label web. The thermal label comprises a face stock layer comprising a heat sensitive part and an adhesive layer. Thermal label can be labelled to the surface of an item through the adhesive layer. Thermal label is used to identify, to provide decoration and/or to display information about the item labelled. The face stock layer may comprise or consists of a thermal paper. The adhesive layer may comprise or consist of a pressure sensitive adhesive.

Overlying/underlying refers to an arrangement of a layer in relation to another layer. Overlaying/underlying refers to an arrangement, where a layer partially or completely overlies/underlies another layer. The overlying/underlying layers are not necessarily in contact with each other, but one or more additional layers may be arranged between the overlying layers.

Adjacent refers to an arrangement, where a layer is next to another layer. Adjacent layers are in contact with each other and no additional layers are between the layers.

Topmost (outermost, uppermost, upmost) layer refers to a configuration of a label web and label structure, where the topmost layer forms upper part of the structure arranged opposite to the surface attaching the surface of an item when labelled. Topmost layer of a linerless thermal label web and labels produced is a release layer.

Undermost (lowermost) layer refers to a surface forming bottom part of the label web and label structure arranged opposite to the topmost surface. Undermost layer is in contact with the surface of an article when labelled. Undermost layer of the linerless label web and label cut from the web is the adhesive layer.

Linerless Thermal Label Web and Labels Produced Thereof

According to an embodiment and with reference to FIG. 1 a linerless thermal label web and thermal label 3 produced thereof comprise adjacent layers, which are in the following order: a release layer 4, a thermal paper 6, an adhesive layer 8. The release layer 4 forms topmost layer of the label web structure. The adhesive layer 8 forms undermost layer of the label web structure. The adhesive layer 8 is suitable for attaching the label to the surface of an item to be labelled. Due to the specific order of the layers the label web is self-wound web suitable for wounding to a roll and subsequent unwinding of the roll.

Figure 2:
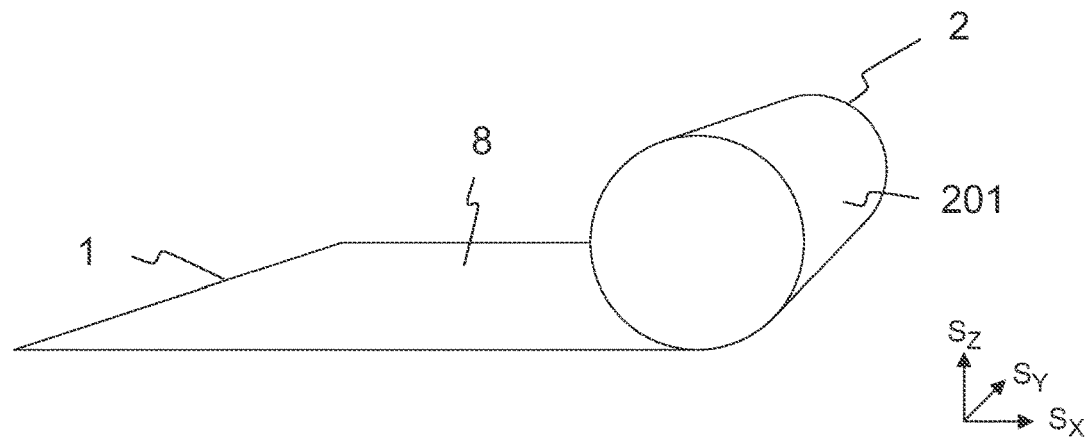
FIG. 2 shows a linerless thermal label web wound on a roll.
Figure 3:
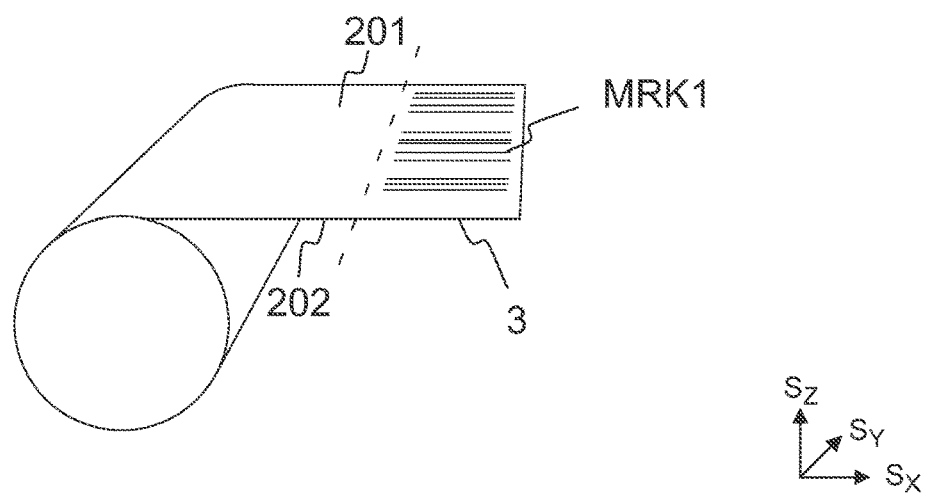
FIG. 3 shows a linerless thermal label web comprising printing.

FIG. 2 provides a view of a continuous linerless thermal label web 1 supplied on a roll 2. Due to the release layer the label web can be rolled without using a separate release liner to prevent the blocking of the web. The continuous label web may be cut after printing and during labelling in order to provide individual thermal labels having a desired shape and size, as shown in FIG. 3. With reference to FIG. 3, the printed label web 1 may be cut along the dashed line so as to form an individual printed thermal label 3. A linerless thermal label web according to embodiments of the application are suitable for use in variable information printing applications, such as logistic center and retail labelling applications. For example, address labels, self-service weight-scale labels, labels used for in-store pricing of foodstuff so as to provide identification and variable information, such as logistic information, weight, price, QR code or EAN bar code.

In the following, layers of a linerless thermal label web are explained in more detailed.

Release Layer

Linerless thermal label web and labels produced thereof include a special release coating layer 4 allowing the continuous label web 1 to be wound on a roll 2 without adhesive layer 8 sticking to the label material below it. Release coating layer may also provide protective layer for the top coat layer and thermal paper underlying the release layer. In a roll the release layer forms an outer layer 201 of the roll. Release layer as an outer layer may protect the adhesive layer e.g. from dusting. The release layer is uniform and continuous layer comprising or consisting of a material, such as silicone, having high repellence properties towards the adhesive layer 8. The release coating may comprise or consist of silicone, for example, cross linkable silicone curable to a cross-linked silicone, i.e. into a poly dimethyl siloxane network, PDMS $(Me_2SiO)_n$. In order to achieve a release coating layer free radical curing silicone systems may be used. For example, a silicone acrylate resins, which cure via a free-radical mechanism. The free radical curing silicone may be cured, for example, by UV radiation, LED or electron beam. Preferably, the release coating layer 4 comprises free radical silicone, which is curable by using UV and photoinitiator. The free radical curing reaction is provided in presence of nitrogen so as to provide inerting atmosphere during UV exposure and exclusion of oxygen from the surface of the substrate and the area under the UV source. The free radical curing silicone curable by ultraviolet (UV) radiation cures at room temperature and thus has effect on minimizing the energy consumption and avoiding interference of the heat effecting the adjacent thermal paper. In addition free radical silicone cured with UV light has effect on providing excellent rub off value for the release layer. Rub off test for measuring the anchorage of the silicone layer is modified from the FINAT test method FTM7 (silicone coat weight by energy-dispersive x-ray fluorescence spectrometry), FINAT technical Handbook 8$^{th}$ edition, 2009. The rub off test includes analyzing the silicone coat weight of according to FTM7; rubbing the silicone layer with an instrument having a weight of 1 kg and felt surface; analyzing the rubbed silicone layer according to FTM7; calculating the difference so as to achieve a value for rub off. Rub off value of the release layer may be less than 5%, less than 2%, or equal or less than 1%. Low rub off value less than 5%, preferably less than 2% indicates good adherence of the release coating layer and enables efficient handling of the linerless label web e.g. in high speed cutting lines and process steps including un-winding of the label web roll. Standard medium-pressure mercury UV lamps (arc lamps) or microwave-induced UV lamps can be used to cure the free radical curing silicones.

An amount of release coating layer 4 may be equal or less than 1.5 g/m$^2$ or equal or less than 1.1 g/m$^2$ (dry grammage). The amount of release coating may be at least 0.1 g/m$^2$ or at least 0.5 g/m$^2$. The amount of release coating may be between 0.1 and 1.5 g/m$^2$ or between 0.5 and 1.5 g/m$^2$ or between 0.9 and 1.1 g/m$^2$. With the specific amount of release coating, the uniform and predefined coverage of the release layer may be achieved. Due to the release coating layer, the linerless thermal label web 1 can be easily unwind from the wound roll. Due to the specific grammage equal or less than 1.5 g/m$^2$ or equal or less than 1.1 g/m$^2$, the release layer coating does not interfere the image forming during thermal printing of the thermal label web.

According to an embodiment, the release layer 4 consists mainly of cross-linked silicone. Cross-linked silicone may be based on cross linkable silicone comprising acrylate groups. In other words the release layer includes at least 70 wt. %, or at least 80 wt. % of cross-linked silicone, for example between 70 and 90 wt. %, or between 70 and 100 wt. %. The properties of the release layer, such as release value and anchorage, may be optimized. In an example, acrylate-functional silicone resins having greater amounts of cross-linkable functional acrylate groups may have effect on providing higher cross-linking density for the release layer. In an example, acrylate-functional silicone resins having less cross-linkable functional acrylate groups and increasing number of long chain siloxane units may have effect on providing lower cross-linking density for the release layer.

In addition, the release layer 4 may comprise silica (SiO$_2$). Silica may have effect on the anchorage of the silicone coating layer to the layer beneath, such as thermal paper. Silica may also have effect on reducing friction so as to facilitate the unwinding of the label web roll. Silica may also have effect on reducing the friction. Reduced friction may prevent or slow down the wearing of the thermal head during thermal printing. In an example, release layer comprising silica may have static and dynamic coefficient of friction below 0.6, for example between 0.3 and 0.6, when measured according to standard ASTM D1894 against glass surface. Silica may still further have effect on providing matt surface facilitating the optical character recognition of the graphical markings, such as bar codes. Silica may still further enhance heat conduction of the release layer so as to improve the image formation of the thermal label during thermal printing. As an example, heat conduction of silica is 1.3-1.4 W/mK and silicone has heat conduction 0.2 W/mK.

According to an embodiment, the release layer comprises less than 20 wt. %, or less than 10 wt. % of silica particles. For example, amount of silica particles may be between 0.5 and 20 wt. % or between 0.5 and 10 wt. %. Size of the silica particles may be below 10 μm or below 7 μm, for example between 0.3 and 10 μm.

According to an example, a release layer coating composition comprises 20-50 wt. % of silicone resin having high content of cross-linkable functional acrylate groups and 30-50 wt. % of silicone resin having long chain siloxane units. In addition the release layer comprises between 5 and 20 wt. % of silica and 2 wt. % of photoinitiator.

A release layer coating composition may be applied onto the thermal paper surface by gravure or roll coating. For example, a face side of the thermal paper is coated with the release layer. In order to improve the anchorage of the release layer, the surface of the thermal paper may be corona treated prior to application of the silicone coating. Alternatively, a release layer coating composition may include adhesion promoter so as to improve the anchorage.

In an example, silicone layer comprising silica particles has effect on print sensitivity as disclosed in the following table 1, wherein optical density with different print head energy levels (darkness) and speeds (10.1 cm/s and 20.3 cm/s) are provided. In an example, at higher energy levels corresponding to darkness 13 and 9, the optical density of the thermal paper siliconized including silica is clearly improved (print head speed 10.1 cm/s) when compared to thermal papers of high speed and normal. Improved optical density enables high quality of the printed label. The greater the optical density the higher the contrast between the thermal paper and the printed graphics, which thus improves readability of the printed graphics of the label. Preferably the optical density is above 1.0.

TABLE 1

|  | Darkness 27 Zebra DT speed 10.1 cm/s; 20.3 cm/s | Darkness 17 | Darkness 13 | Darkness 9 |
| --- | --- | --- | --- | --- |
| Siliconized (with silica) high speed thermal paper | 1.510; 1.457 | 1.493; 1.287 | 1.428; 1.040 | 1.217; 0.907 |
| High speed thermal paper | 1.223; 1.230 | 1.223; 1.210 | 1.248; 1.178 | 1.197; 1.010 |
| Normal thermal paper | 1.213; 1.200 | 1.207; 1.107 | 1.153; 0.933 | 0.963; 0.677 |

In an example, silica particles has effect on print surface roughness of the release layer as disclosed in the following table 2. The surfaces were tested according to ISO 8791 test method. Roughness of the release layer comprising silica may be between 1.25 and 1.50, which is near to the roughness of the thermal paper.

TABLE 2

|  | Silicone A without silica | Silicone B without silica | Silicone C without silica | Silicone D with silica | Silicone E with silica | Silicone F with silica | A top coated thermal paper | A non-top coated thermal paper |
| --- | --- | --- | --- | --- | --- | --- | --- | --- |
| Roughness | 1.21 | 1.16 | 1.15 | 1.47 | 1.31 | 1.38 | 1.43 | 1.49 |

In an example, silica particles has minimal or no effect on static and dynamic coefficient of frictions when compared to reference thermal paper as disclosed in the following table 3, wherein results for 6 parallel samples tested against glass surface are presented. Release layer comprising silica has coefficient of friction between 0.3 and 0.6 against glass surface. The surfaces were tested according to ASTM D1894 test method.

TABLE 3

|  | Silicone B without silica | Silicone C without silica | Silicone E with silica | Silicone F with silica | A top coated thermal paper |
|---|---|---|---|---|---|
| Static coefficient of friction | 1.25 | 1.34 | 0.47 | 0.48 | 0.34 |
| Dynamic coefficient of friction | 1.15 | 1.23 | 0.49 | 0.52 | 0.45 |

In an example, release layers comprising silica have better bar code readability especially at higher energy levels (i.e. energy stage 80 and 100) as disclosed in the following table 4. The readability of surfaces comprising bar codes (3 parallel samples) were tested according to bar code print quality ISO/IEC 15426-1 standard with different energy levels 60, 80 and 100. The ISO/IEC standard specifies seven major parameters that are measured and graded, the average of all seven parameters provides an overall grade for the bar code. In ISO terminology 4 is best, 0 is Fail, in ANSI terminology A is best, F is Fail. Values above 1 are eligible.

TABLE 4

|  | Fence bar code (0 degree) 60/80/100 | Lader bar code (90 degree) 60/80/100 |
|---|---|---|
| Silicone without silica | 0/0.2/3 | 0.25/0.5/2.65 |
| Silicone with silica | 0/0.85/3.3 | 0.15/2.75/2.5 |

Thermal Paper

Figure 4:
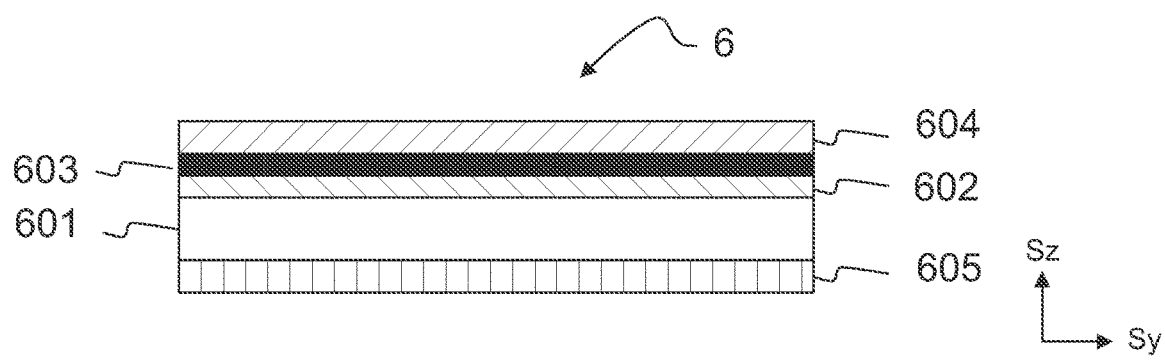
FIG. 4 shows an example of a thermal paper.

Thermal paper 6 refers to a paper comprising a heat sensitive part having heat sensitivity and which is thermally activatable. Heat sensitive part having heat sensitivity provides printability for the thermal paper. Printability allows providing identification and variable information, such as logistic information, weight, price or EAN bar code on the thermal paper. Heat sensitivity is provided, for example, by a thermal coating layer 603. Thermal coating is activated using heat. Thermal paper comprising the thermal coating layer provides the heat sensitive part of the thermal label web and labels produced thereof. Thermal paper may comprise several layers. With reference to FIG. 4, thermal paper 6 includes at least a base paper layer 601 and a thermal coating layer 603. Further it may comprise additional layers, such as preliminary coating layer 602, top coating layer 604 and/or back coating layer 605. In an example, the thermal paper includes in the following order: top coating layer 604, thermal coating layer 603, preliminary coating layer 602 and a base paper layer 601. In an example, thermal paper may have basis weight of 75 g/m². Basis weight may be between 65 and 80 g/m².

In the following different layers of the thermal paper 6 are presented in more detailed.

Base Paper

A thermal paper 6 comprises a base paper 601. A base paper refers to a paper comprising natural fibres as its main raw material. Further, the base paper may comprise, for example, one or more fillers and/or additives. The base paper may be uncoated paper. The base paper may comprise natural fibre. Natural fibre refers to any plant material that contains cellulose. The natural fibre may be wood-based. The wood may be softwood, such as spruce, pine, silver fir, larch, Douglas fir, or Canadian hemlock; or hardwood, such as birch, aspen, poplar, alder, eucalyptus, or acacia; or a mixture of softwood and hardwood. Other than wood-based raw materials may include agricultural waste, grasses or other plant materials, such as straw, leaves, bark, seeds, legumes, flowers, tops, or fruit, which have been obtained from cotton, corn, wheat, oat, rye, barley, rice, flax, hemp, Manila hemp, sisal hemp, jute, ramee, kenaf hemp, bagasse, bamboo, or reed. Preferably, the natural fibre comprises chemically pulped natural fibre, that is, pulp made in a chemical pulping process.

A base paper may comprise raw material originating from a chemical pulp or a chemithermomechanical pulp (CTMP). The formed mass may be bleached. Content of fibres originated from a chemical pulp or a chemithermomechanical pulp may comprise at least 50-60 percentage of weight (wt-%) of base paper fibers. Amount of chemical pulp and/or CTMP originated fibers of all the base paper fibers may be up to 80-90 wt-%. Most natural fibres, for example 95 wt-%, used in the base paper may be chemically or chemithermomechanically pulped natural fibres. Alternatively or additionally, mass may originate at least partly from mechanical- or thermomechanical pulp. The diameter of the natural fibres may be 15 to 25 µm and the length more than 500 µm, or for example 1-1.5 mm. The present application and embodiments are not limited to fiber size.

A base paper may comprise basis weight of 20-200 g/m². The base paper may comprise short and/or long fibres. Typically long fibres yield from softwood pulping, and short fibres from hardwood pulping. Long fibres of the softwood may provide strength to a base paper and enhance runnability on a paper machine. Short fibres of the hardwood may have effect on the end-use of the base paper.

The base paper may comprises a filler. Content of a filler in a base paper may be 5-30 wt-%; advantageously 5-20 wt-%. The content of the filler in a base paper may depend on utilization and/or end use of the base paper. A filler may comprise clay, talc, silicon dioxide (silica) and/or calcium carbonate. A filler may be used to fill spaces between fibres in a base paper. A filler may provide more weight to a base paper. In an end product an effect of a filler may be enhancing weight properties, smoothening a surface and/or decreasing opacity.

A base paper has such strength properties that it is suitable to be coated. A base paper may have such strength properties that it is suitable for finishing at a coating stage. The base paper withstands the amount of the used coating. The coated paper withstands printing phase. The fibers of the base paper may be oriented so that the base paper has required strength to both machine direction and the direction perpendicular to it. Depending on end use, even three dimensional strength properties may be desired. For label products strength of paper may withstand a die cutting phase, which comprises finalizing labels to obtain their final form by pressing with a metal frame and extracting extra portions at a process speed.

Paper Coating Layer

The base paper may be coated. Coating may enhance property or quality of the paper, or make the paper face suitable for certain use. The coating may change surface properties of the base paper. The coating paste may penetrate to the paper. Coating may be applied as contour type coating, spray or curtain coating, a film transfer coating, or blade/rod coating. A coating may comprise binders and pigments, and optionally additives. The coating may comprise an additive, like carboxymethyl cellulose. Amount of an additive may be minor compared to the other ingredients. The pigments may be for example a calcium carbonate ($CaCO_3$) and clay. The coating may comprise amount of calcium carbonate in relation to the amount of clay 1:1. It is possible to employ more clay, or even only clay in a coating. Amount of clay in a coating may be 10-100 wt-%; or at least 10 wt-%; or preferably at least 15 wt-%; or more preferably at least 20 wt-%. In order to achieve light (—white), optical surface, a pigment(s) may be added. Clay may comprise plate like pigments, which provide a compact, tight surface. A binder may comprise double bonds. The binder may be latex, for example a styrene butadiene latex (SB) or a styrene acrylic (SA). Amount of binder in the coating may be 10-30 wt-%. Amount of binder in the coating may be 15-20 wt-%, or 20-30 wt-%, or 20-25 wt-%, or 25-30 wt-%, or preferably 25 wt-%. Latex used as a binder may enable coating on a paper machine. Latex has effect on later printing process. As an example, latex may have dominating effect for printability of the paper. Latex binds the pigments used in printing to the paper. Coating of a paper may enhance surface properties, for example smoothness, of the paper. Smooth surface may enhance the application of the thermal coating layer 603. Thus enhancing the quality of the thermal paper. In addition, coating comprising pigment(s) may provide thermal insulation.

Latex may bind mineral pigments used in coating to each other and to the surface of the paper. Latex may provide a compact and flexible structure.

Latex may have effect of providing good bonding strength. For example if starch is used and the same bonding strength is desired, the amount of starch shall be two times the amount of latex. Thus less latex may be enough for the same quality. Latex may provide a moisture resistant surface. A runnability is good with latex, when compared to a coating comprising starch, for example. Starch is a dry component, thus may require lot of additional water during coating process. Amount of water in a starch leads to an end result, where the amount of starch in the coated paper is quite modest, for example 2-3 wt-% of the coated paper. Whereas amount of coating comprising latex may be for example 10 wt-% of the coated paper. Adding amount of coating may provide durability and strength to the coated paper.

The coating may comprise binder(s) and pigment(s) 70-90 wt-%; preferably at least 70 wt-%; more preferably at least 80 wt-%; most preferably at least 90 wt-%. It is possible to utilize other pigment(s) instead of, or in combination with, carbonate. For example, titanium may be utilized. The coating may comprise 22-24 parts binder, for example polyvinyl alcohol (PVA).

The coating may be added on a surface of a paper at the end phase of the papermaking machine or off-line, during some later phase, after the papermaking machine. The coating process may be of a batch type or continuous. Coating may be applied onto at least one surface of the paper. In an example the coating may be used as a preliminary coating 602 of the thermal paper. Preliminary coating may enhance the application of the thermal coating layer 603. It may further provide protection and provide insulation for the thermal layer during application of an adhesive layer 8 and prevent heat adversely affecting the thermal layer. Respectively the preliminary coating 602 layer may protect the adhesive layer 8 during thermal printing process of the thermal label web. Content of a preliminary coating 602 may be 2-15 $g/m^2$; preferably 5-12 $g/m^2$. Further a coating may be applied on top of the thermal coating layer 603 so as to provide top coating layer 604 for the thermal paper 6. The content of a top coating may be 2-4 $g/m^2$. The coating may be added to one surface of the base paper only. The other surface of the base paper may comprise surface adhesive paste or starch, for example. Alternatively, it may comprise filmic barrier layer 605. When the end product is a label, the other side of the base paper comprises an adhesive layer 8.

Coating may comprise two or more coating layers providing multilayer coating structures. Sometimes better quality end results may be achieved, and/or properties of the coating increased, when at least two coating layers are applied. In a multilayer coating the coating layers may be similar layers, comprising the same components.

Coating may comprise curtain coating, roll coating, foam coating, spray coating or blade/rod. The coating may comprise curtain coating. The coating may comprise a multilayer curtain coating.

A Thermal Coating

The thermal coating 603 comprises reactive components. The thermal coating 603 may comprise a matrix. The matrix may comprise dye and developer. The dye may comprise leuco type dye. The developer may comprise acid. The thermal coating matrix in a solid state is heated above its activation- or melting point. The leuco dye is arranged to react with acid and change to a coloured form. Thermal coating may comprise dye, developer, sensitizer, binder.

Dye of the thermal coating may comprise leuco dye. Leuco dye is arranged to change colour in response to change in temperature. Crystalline and/or pH neutral leuco dye is in colourless leuco form. When dissolved in a melt form and/or exposed to acid environment, the leuco dye changes to a coloured form. Leuco dye may comprise for example triaryl methane phthalide dyes, fluoran dyes or crystal violet lactone.

Developer of the thermal coating may comprise acid. Developer is arranged to co-react with dye. Reaction of dye with the developer is arranged to trigger colour formation. Developer may comprise sulfonyl ureas, zinc salts of substituted salicylic acids or phenols, for example Bisphenol A (BPA) or Bisphenol S (BPS).

Sensitizer may be used in a thermal coating to decrease melting point of dye and/or developer. Dye and developer react, when heated above melting point of matrix of the thermal coating. The melting point of the matrix may depend on melting point values of its components. Thermal threshold of the thermal coating is melting point of the component of the thermal coating having the lowest melting point. Sensitizer of the thermal coating is arranged to decrease melting point of dye and/or developer. This has effect of proving accuracy to the melting point and/or optimizing temperature of colour change and/or facilitating mixing of dye and developer. Sensitizer may comprise low viscosity solvent(s) or simple ether molecules, such as 1,2-bis-(3-methylphenoxy)ethane or 2-benzyloxynapthalene.

Optionally the thermal coating may comprise stabilizers. Dyes in thermally sensitive paper may be unstable tending to return to their original colourless crystalline form. The thermal paper is sensitive to hot and humid external conditions, for example. In order to stabilize the metastable glass formed by leuco dye, developer and sensitizer, a stabilizer may be added to the mixture. Stabilizers have effect of inhibiting recrystallization of the dye and developer and/or stabilizing the print.

Binder of the thermal coating may have effect of facilitating a thermal coating to adhere to a base paper or to a preliminary coating (pre-coat). Binder may comprise double bonds. The binder may comprise polyvinyl alcohol (PVA) or latex, for example a styrene butadiene latex (SB) or a styrene acrylic (SA).

With reference to FIG. 4, a thermal paper 6 according to an embodiment is presented. The thermal paper comprises a base paper 601 coated with a preliminary coating 602. A preliminary coating 602 is applied on the base paper 601 i.e. the preliminary coating is adjacent to the base paper. The preliminary coating 602 may comprise pigments and binders. The preliminary coating may comprise or consists of similar substances than paper coating layer, as discussed in the previous. The preliminary coating layer may have effect of reducing heat transfer from a thermal coating to a base paper. This may enable enhanced or high resolution print to be formed. The preliminary coating layer may further have effect of providing smoothness to the thermal paper. It may still further provide thermal insulating layer for hot melt adhesive, especially during application of the adhesive layer at temperatures around 150 degrees C.

The thermal coating 603 is arranged on top of the preliminary coating layer 602 so as to form a thermal sensitive, reactive layer for the thermal paper. The thermal coating layer is adjacent to preliminary coating layer. Further, a top coating layer 604 is applied on a thermal coating 603. The top coating layer 604 is arranged on top of the thermal coating 603. The top coat 604 may form the topmost layer of the thermal paper. In other words, top coat layer may be the face side of the thermal paper receiving a release layer. Top coating layer may comprise polyvinyl alcohol. The top coat is arranged to form a protective coat for the thermal coating layer 603. The top coat may have effect of protecting the thermal paper from mechanical stress and/or chemical reactions. The top coat may provide better anchorage of a release layer. The top coat may still further have effect on preventing absorption of the silicone coating layer into the underlying layers of the thermal paper during its application.

According to an embodiment, the thermal paper may further comprises a back coating layer 605. The back coat is applied on a base paper 601 surface, which is opposite to the base paper surface 601 on which a preliminary coating 602 and/or a thermal coating 603 is applied. The back coat 605 is arranged on the base paper 601. The back coat 605 may form the lowermost layer of the thermal paper. Back coat layer may comprise polyvinyl alcohol. The back coat may be a barrier layer providing protection for the thermal paper during lamination, printing or other mechanical processes. The back coat may protect thermal paper from external influences, for example from external chemical influences, like components of the adhesive layer. Back coat of thermal paper is optional. For example thermal paper may lack the back coat. An amount of the back coat may be 1-4 g/m$^2$ In an example, the thermal paper 6 may have dynamic thermosensitivity of around 1.4 indicated as an optical density (OD) with head energy at least 15 mJ/mm$^2$, when printed at a printing speed of 100 mm/s. Static thermosensitivity of the thermal paper 6 may be between 1.2 and 1.4, when indicated as an optical density (OD) at temperatures above 140 degrees C., and measured on a heat gradient tester. Typically, optical density is 0.1 at temperatures between 70 and 100 degrees C.

Adhesive

A label web and labels produced thereof include an adhesive layer 8 as an undermost layer of the web structure suitable for adhering the label to the surface of an item labelled. In a roll the adhesive layer forms an inner layer 202 of the roll. Label comprising pressure sensitive adhesive may be referred to as a pressure sensitive adhesive (PSA) label. Thus, linerless thermal label webs and labels produced thereof, which comprise pressure-sensitive adhesive layer are referred to as linerless thermal PSA label webs and linerless thermal PSA labels, respectively. Pressure sensitive adhesive products, such as label webs and individual labels cut thereof, may also be referred to as self-adhesive products, label webs and individual labels respectively. The labels comprising PSA can be adhered to most surfaces through an adhesive layer without the use of a secondary agent, such as a solvent, or heat to strengthen the bond. The PSA forms a bond when pressure is applied onto the label at room temperature, adhering the label to the item to be labelled. Preferably, the adhesive layer 8 includes solid PSA (also referred to as hot melt PSA). The adhesive layer is provided by spreading the solid PSA directly onto the surface of the thermal paper 8. The adhesive layer may be coated onto the surface of the thermal paper by slot-die, metering rod or roller coating. Application temperature of the adhesive layer may be around 150 degrees C., at most 175 degrees C. Thermal paper may be cooled e.g. by a cooling roll when spreading the melted adhesive so as to minimize the adverse effects caused to the thermal properties of the paper. An amount of adhesive i.e. coat weight of the adhesive may be between 9 and 18 g/m$^2$, preferably between 12 and 14 g/m$^2$. However, if the cooling roll is used for cooling the thermal paper during spreading of the adhesive, higher temperature of the adhesive may be used resulting lower coat weight of adhesive, for example less than 9 g/m$^2$.

Figure 6:
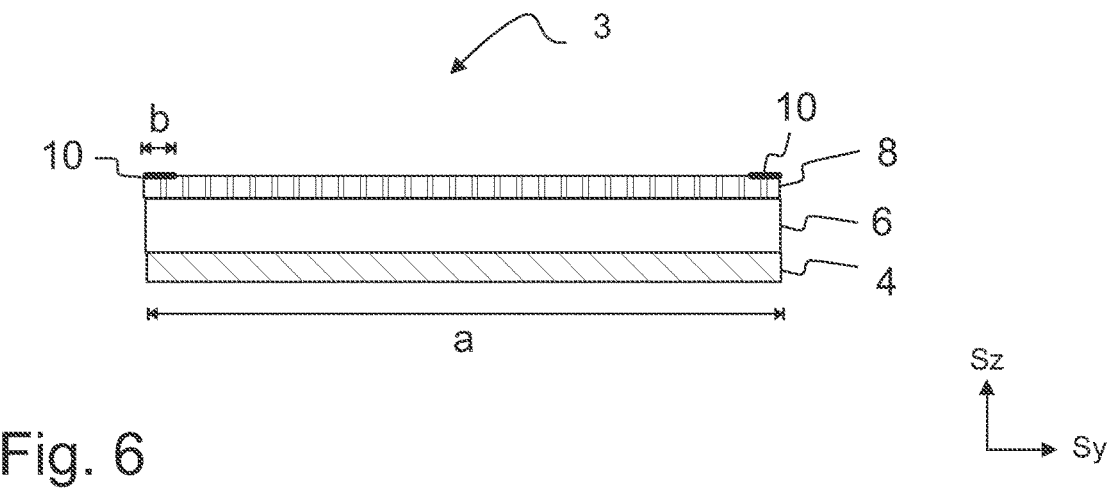
FIG. 6 shows a linerless thermal label.

Adhesive layer may be uniform and even. Preferably, the adhesive layer is uniformly spread onto the whole surface area of the thermal paper 6. In an example whole underside area of the thermal paper is coated with adhesive layer. Underside of the thermal paper to be coated may be either a surface of the base paper 601 or a surface of a back coating layer 605. Adhesive layer covers at least the whole surface area of the thermal paper in the transverse direction Sy of the thermal paper, as shown in FIG. 6. Whole surface area in the transverse direction refers to the area extending from the first longitudinal edge 607 to the second longitudinal edge 609. The longitudinal edges of the thermal paper extend in the machine direction Sx of the continuous web. Whole surface area of the thermal paper coated with the adhesive may have effect on providing equal thickness for the thermal web. Equal thickness of the label web may further have effect on improving the printability and quality of the print. Total thickness of the linerless thermal label web may be between 70 and 100 microns. For example, the label web may contain printing on the whole area extending from the first longitudinal edge 607 to the second longitudinal edge 609. In other words, also the longitudinal edge areas of the linerless thermal web may comprise printed graphics. Longitudinal edge areas correspond to the deadened adhesive areas 810, 820. Further equal thickness may improve running properties of the web, which may be crucial especially during winding of the narrow webs.

The adhesive layer 8 may comprise a specific solid PSA formula comprising: styrene based polymer(s), tackifier(s), such as solid or liquid resin(s), and oil(s). Styrene based polymers include: di-block (SB) and tri-block (SBS) styrene butadienes, and styrene-isoprene-styrene (SIS). Tackifiers include hydrocarbon tackifier resin (HC resin) and terpene and rosin based derivative resins. Terpene and rosin based derivate resins include, for example, terpene resin, rosin acid resin, and rosin ester resin. HC resin may be either aliphatic (C5), aromatic (C9), DCPD (dicyclopentadiene), or mixtures of these. Styrene based polymers have effect on providing specific cohesion and network structure for the adhesive layer. In turn, tackifiers are able to provide required adhesion. The adhesive layer may further comprise additives, such as oil(s), antioxidant(s) and UV-inhibitor(s). Oli(s) may comprise paraffin, naphtha and/or silicone oil. Silicone oil may have lubricating effect on the cutting blades of the label web. An amount of oil(s) is less than 17 wt. % or less than 12 wt. %, preferably less than 5% or less than 3%. Antioxidants may be phenolic, phosphite, thioester or aminic. In an example, phenolic antioxidants are primary antioxidants and proceed as free radical scavengers. Phosphite antioxidants are secondary antioxidants breaking down e.g. peroxides. Amount of antioxidants is less than 5 wt. %, less than 3% or less than 1%. In addition the adhesive layer may comprise filler(s), such as $CaCO_3$.

According to an embodiment, a solid PSA formula may comprise: styrene-butadiene rubber (SBR), styrene-isoprene-styrene (SIS), hydrocarbon tackifier resin (HC resin), rosin ester resin, oil mixture and antioxidant(s). Total amount of styrene based polymers may be between 30 and 45%. Total amount of tackifier(s) may be 40 and 60 wt. %. Total amount of oil(s) may be less than 12%. Total amount of antioxidants may be less than 1%.

The above solid PSA formula may have effect on exhibiting high enough cohesion of the adhesive at thermal printing temperatures and thus better resistance of temperatures caused by the thermal printer, which may be above normal room temperature e.g. 40° C. Dynamic-mechanical results, such as storage modulus i.e. G' (Pa) and damping factor i.e. tan(delta) at room temperature indicate cohesion of the adhesive. In an example, high cohesion adhesive suitable for linerless thermal labels exhibits storage modulus G' at RT above 70 000 Pa or above 90 000 Pa, for example between 70 000 and 200 000 Pa or between 90 000 and 200 000 Pa; and over 30 000 Pa still at 60° C. Further the adhesive exhibits damping factor tan(delta) at RT below 0.6 or below 0.5, for example between 0.3 and 0.6; and below 0.6 still at 60° C. Dynamic-mechanical measurements are provided by using heating rate 2° C./min and temperature range from +20 to +100° C. The PSA formula with the specific cohesion may further have effect on providing good cuttability of the adhesive layer during cutting process of the label web providing individual labels. The PSA formula has also effect on providing improved cleanliness of the cutter.

Properties of the adhesive layer consisting of solid PSA according to an embodiment (linerless hotmelt) and layer consisting of a general purpose solid PSA (general purpose hotmelt) are provided in a Table 5 (average of 3 parallel samples). Results of Table 5 indicating high tack and peel values of the linerless hotmelt has effect on increased tack of the adhesive. In an example, linerless hotmelt adhesive exhibits tack on HDPE at room temperature between 6 and 13 N/25 mm, when measured according to FTM9 (FINAT technical Handbook 8th edition, 2009). In an example, linerless hotmelt adhesive exhibits peel adhesion on HDPE at room temperature between 5 and 12 N/25 mm, when measured according to FTM2 (peel 90°); (FINAT technical Handbook 8th edition, 2009) and tested after applying the test strip to the HDPE test plate for a period of 3 minutes (instead of 20 minutes disclosed in the FTM2).

Respectively high shear value has effect on providing increased shear resistance of the adhesive. In an example, linerless hotmelt adhesive exhibits dynamic shear at room temperature of at least 60 N/25 mm, in an example between 60 and 90 N/25 mm, when measured according to FTM18 (FINAT technical Handbook 8th edition, 2009). Shear resistance of the adhesive has effect on reducing the oozing (spreading/squeezing out) of the adhesive, when the label web is wound to a roll.

TABLE 5

|  | Tack on HDPE at RT (N/25 mm) | Tack on cardboard at RT (N/25 mm) | Peel on HDPE at RT (N/25 mm) | Dynamic shear at RT (N/25 mm) |
|---|---|---|---|---|
| Linerless hotmelt | 11.7 | 5.3 | 9.8 | 80 |
| General purpose hotmelt | 9.4 | 4.0 | 7.2 | 45 |

Deadened Adhesive Areas

Figure 5:
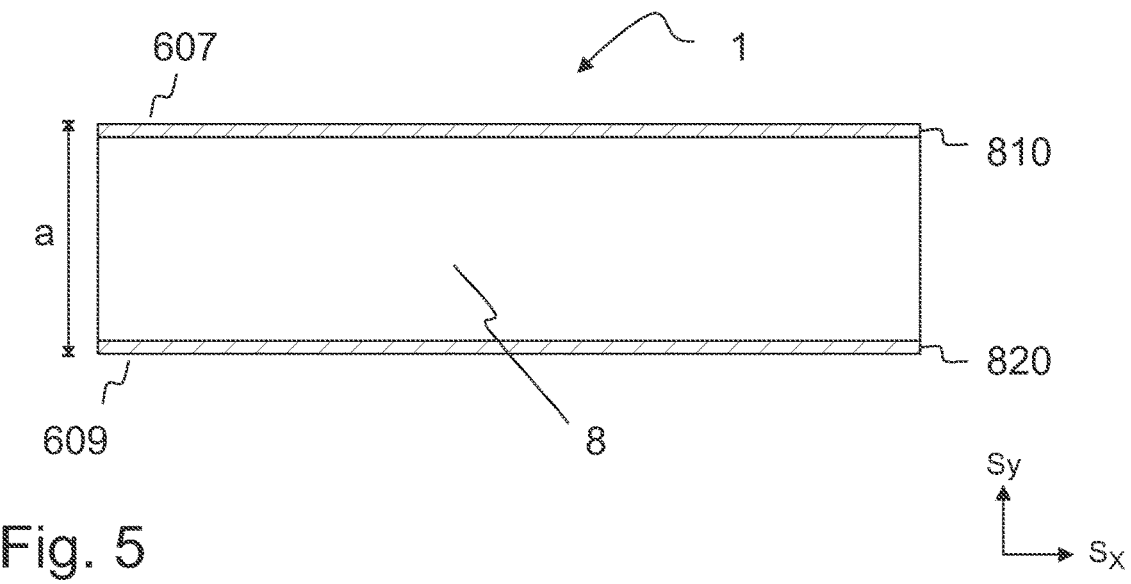
FIG. 5 shows an adhesive side of a linerless thermal web.

With reference to FIG. 5, the longitudinal ($S_x$) edge areas 810 and 820 of the adhesive layer 8 of the label web 1 include adhesive deadening varnish 10. Longitudinal edge areas 810, 820 of the adhesive layer comprising adhesive deadening varnish may be referred to as deadened adhesive areas. The longitudinal edge areas 810, 820 including the deadening varnish 10 extend at most 10 mm from the first longitudinal edge 607 and from the second longitudinal edge 609 towards centre of the web. Each of the deadened adhesive areas 810, 820 may extend between 3 and 7 mm, for example 5 mm, from the first longitudinal edge 607 and the second longitudinal edge 609 towards centre of the web. In other words, width b of the deadened adhesive area may be from 3 to 7 mm, for example 5 mm. In an example, each of the deadened adhesive areas 810, 820 may cover less than 12% of the width a of the label web. Each of the deadened adhesive areas 810 and 820 may cover from 3 to 12%, for example 8%, of the width a of the label web. Width a of the label web may be for example 58 mm. Alternatively it may be 50, 76, 80 or 100 mm. Total deadened adhesive area may be from 6 to 24%, for example 16% of the width a of the label web. With reference to FIG. 6, the adhesive deadening varnish 10 may be provided in the edge areas on top of the adhesive layer 8 so as to reduce the tackiness of the adhesive in that area. In other words the adhesive layer 8 has deadened adhesive areas 810 and 820 having reduced tackiness extending in a longitudinal direction $S_X$ of the continuous label web. The deadening agent may further have effect on reducing the oozing (spreading/squeezing out) of the adhesive, when the label web is wound to a roll. Further it may prevent the thermal printer from getting dirty of the adhesive. The deadening varnish may be provided by pressing techniques using e.g. anilox rollers. An amount of deadening varnish may be between 2 and 5 $g/m^2$, or between 2 and 3 $g/m^2$. The adhesive deadening varnish has minimal or no effect on the total thickness of the label web.

The adhesive deadening varnish may be water-soluble. Preferably the adhesive deadening varnish is crosslinkable UV varnish. The adhesive deadening areas 810 and 820 may comprise crosslinkable UV varnish, such as polyurethane-acrylate varnish or polyacrylate varnish. The crosslinkable UV varnishes are self-crosslinking thus avoiding mixing with adhesive layer components and loss of deadening effect.

Manufacturing

Manufacturing of a linerless thermal label web may comprise at least the following steps:
  providing a longitudinally ($S_x$) extending web of thermal paper having a face side and an underside, coating the face side of the thermal paper web with a release layer, coating the underside of the thermal paper web with a pressure sensitive adhesive, cutting the thermal paper web comprising the release layer and the pressure sensitive adhesive layer in a slitting process into a width of around 0.5 m, print varnishing patterns/stripes of adhesive deadening agent on the pressure sensitive layer of the web with so as to provide deadened adhesive areas, cutting the pattern/stripe varnished web in a slitting process into a width of the final linerless label web e.g. between 50 and 130 mm, such as 58 mm or 80 mm, so that the first and the second longitudinal edges of the final label web include deadened adhesive areas, winding the final linerless label web with the specific width into a roll, wherein the adhesive on the underside of the thermal paper adheres releasably to the release coating.

The manufacturing process may comprise further winding and unwinding steps e.g. prior to and after stripe varnishing.

Prior to labelling the final linerless label web with specific width is printed. Label webs comprising a heat sensitive part consisting of thermal paper are suitable for thermal printing. Thermal printing may be used for providing identification and variable information, such as logistic information, weight, price, EAN bar code or QR core. The thermal printing process is arranged to selectively heat a thermal paper. Thermal printing press comprises a thermal printing head. The printing head exposes thermal paper to heat, which is arranged to initiate reactions in the thermal reactive layer for changing colour of the dye. The colour is changed due to change in temperature. Multicolour thermal paper is arranged to react to two or more different temperatures. Multicolour thermal paper may comprise multi thermal coating of separate colorizing layers. Two or more different colours are formed according to the temperature.

The invention claimed is:

1. A linerless thermal label web comprising layers in the following order:
    a release layer,
    a thermal paper comprising a heat sensitive part, and
    an adhesive layer,
wherein the adhesive of the adhesive layer comprises styrene-based polymers between 30% and 45%, and silicone oil such that the storage modulus (G') of the adhesive of the adhesive layer is between 70 000 and 200 000 Pa at room temperature (RT), and such that the damping factor (tan (delta)) of the adhesive layer of the adhesive layer is below 0.6 at the room temperature (RT), wherein the adhesive layer includes an adhesive deadening varnish at longitudinal edge areas of the linerless thermal web so as to reduce the tackiness of the adhesive layer in the longitudinal edge areas,
and wherein a rub off value of the release layer is less than 2%, measured using the FINAT test method FTM7.

2. The linerless thermal label web according to claim 1, wherein an amount of the release layer is between 0.1 and 1.5 g/m$^2$.

3. The linerless thermal label web according to claim 1, wherein the release layer comprises at least 80 wt. % of cross-linked silicone based on cross linkable silicone comprising acrylate groups.

4. The linerless thermal label web according to claim 1, wherein the release layer further comprises silica in an amount of between 0.5 and 20 wt. %.

5. The linerless thermal label web according to claim 1, wherein the release layer has a coefficient of friction of between 0.3 and 0.6, when measured against a glass surface and according to standard ASTM D1894.

6. The linerless thermal label web according to claim 1, wherein the thermal paper comprises the following layers in the following order: a top coating layer, a thermal layer providing the heat sensitive part, a preliminary coating layer, and a base paper.

7. The linerless thermal label web according to claim 6, wherein the top coating layer includes polyvinyl alcohol.

8. The linerless thermal label web according to claim 6, wherein the preliminary coating layer includes binders and pigments.

9. The linerless thermal label web according to claim 6, wherein the base paper has a basis weight of 20-200 g/m$^2$.

10. The linerless thermal label web according to claim 1, wherein the thermal paper further comprises a back coating layer on the base paper surface opposite to the preliminary coating layer.

11. The linerless thermal label web according to claim 1, wherein an amount of the adhesive layer is between 9 and 18 g/m$^2$.

12. The linerless thermal label web according to claim 11, wherein the adhesive layer comprises between 30 and 45 wt. % of styrene based polymer(s), between 40 and 60 wt. % of tackifier(s), and less than 17 wt % of oil(s).

13. The linerless thermal label web according to claim 11, wherein the adhesive layer has dynamic shear at room temperature at least 60 N/25 mm, when measured according to test method of FTM18.

14. The linerless thermal label web according to claim 1, wherein the adhesive layer uniformly covers a surface area of the thermal paper extending from a first longitudinal edge of the thermal paper to a second longitudinal edge of the thermal paper.

15. The linerless thermal label web according to claim 1, wherein the longitudinal edge areas including the deadening varnish extend between 3 and 7 mm from the first and the second longitudinal edge towards a centre of the web and form deadened adhesive areas.

16. The linerless thermal label web according to claim 15, wherein each of the deadened adhesive areas covers 3-12% of a width of the label web.

17. The linerless thermal label web according to claim 16, wherein the width of the label web is 50, 58, 76, 80 or 100 mm.

18. The linerless thermal label web according to claim 1, wherein the deadening varnish comprises polyurethane-acrylate varnish or polyacrylate varnish.

19. A method of using the linerless thermal label web according to claim 1 for variable information printing applications, the method comprising thermally printing the linerless thermal label web according to claim 1, and cutting the web into individual labels prior to labelling.

20. A thermal label cut from the linerless thermal label web according to claim 1.

21. The thermal label according to claim 20, wherein the thermal label comprises thermally printed graphics at the longitudinal edge areas of the linerless thermal label web.

* * * * *